(12) United States Patent
Gerard et al.

(10) Patent No.: US 6,366,684 B1
(45) Date of Patent: Apr. 2, 2002

(54) IMAGE PROCESSING METHOD AND SYSTEM INVOLVING CONTOUR DETECTION STEPS

(75) Inventors: Olivier Gerard, Saint-Maur-Des-Fosses; Shérif Makram-Ebeid, Dampierre, both of (FR)

(73) Assignee: U.S. Philips Corporation, New Yrok, NY (US)

( * ) Notice: Subject to any disclaimer, the term of this patent is extended or adjusted under 35 U.S.C. 154(b) by 0 days.

(21) Appl. No.: 09/286,102

(22) Filed: Apr. 2, 1999

(30) Foreign Application Priority Data

Apr. 3, 1998 (EP) .............................. 98400801

(51) Int. Cl.⁷ ................................. G06K 9/00
(52) U.S. Cl. ..................................... 382/132
(58) Field of Search ................ 382/128, 132, 382/154, 194, 209, 215, 216, 266, 267, 276, 285, 286, 287, 291; 378/23, 62, 901; 128/928, 920, 922; 702/155, 167; 345/419, 420

(56) References Cited

U.S. PATENT DOCUMENTS 5,768,415 A * 6/1998 Jagadish et al. ............ 382/154
5,871,019 A * 2/1999 Belohlavek ................. 600/441
6,072,496 A * 6/2000 Guenter et al. ............. 345/419
6,072,903 A * 6/2000 Maki et al. ................. 382/190
6,106,466 A * 8/2000 Sheehan et al. ............ 600/443
6,154,560 A * 11/2000 Cothren et al. ............. 382/128

OTHER PUBLICATIONS

"Encoding of a priori information in Active Contour Models" in III Transactions of Pattern Analysis and Machine Intelligence, vol. 18, No. 9, Sep. 1996.

* cited by examiner

Primary Examiner—Andrew W. Johns
Assistant Examiner—Shervin Nakhjavan
(74) Attorney, Agent, or Firm—John F. Vodopia

(57) ABSTRACT

The present invention includes a method for processing an intensity image ($J_0$) formed of points representing an object (LV), including steps for automatically supplying points so as to determine a minimum path representing the object contour (CT), involving:

acquiring data of the intensity image, evaluating probability values (P) indicating the probability that a given point of the image belongs to predefined regions of the image relating to the object, and deriving a contour model (SP) of the object from said probability values (P), transforming the image ($J_0$) into a three-dimensional matrix image (IM) based on said contour model (SP) and said probability values (P), performing dynamic programming (DP) in order to determine said minimum path (CT) in said three-dimensional matrix image (IM).

10 Claims, 3 Drawing Sheets

IMAGE PROCESSING METHOD AND SYSTEM INVOLVING CONTOUR DETECTION STEPS

BACKGROUND OF THE INVENTION

1. Field of the Invention

The invention relates to a method for processing an intensity image formed of points, which method involves steps for contour detection of an object represented in the image, including a step for a dynamic programming procedure. The invention also relates to a system with means for carrying out such a method and to an X-ray apparatus associated with a system.

The invention is advantageously used in the medical imaging industry.

2. Description of the Related Art

A method for the detection of contours in an image is already known from the publication "Encoding of a priori Information in Active Contour Models" in "IEEE TRANSACTIONS ON PATTERN ANALYSIS AND MACHINE INTELLIGENCE, VOL. 18, NO. 9, SEPTEMBER 1996". This publication uses the theory of active contours to model the problem of contour recovery as an energy minimization process. The computational solutions based on dynamic programming require that the energy associated with a contour candidate is decomposed into an integral of local energy distributions. The cited publication discloses a grammatical framework that models different local energy models and a set of allowable transitions between these models. The grammatical encoding is utilized to represent a priori knowledge about the shape of the object and intensity elements of the associated image. The variability encountered in numerical experiments is addressed with the energy minimization procedure which is embedded in the grammatical framework. The cited publication discloses an algorithmic solution that combines an algorithm, denoted as the Knuth-Morris-Pratt algorithm for string matching with a dynamic programming algorithm for energy minimization.

The method disclosed in the above publication necessarily includes an initialization step. Furthermore, the method uses only local information to represent the a priori knowledge.

SUMMARY OF THE INVENTION

It is an object of the present invention to provide a completely automated method of contour detection in a complicated image, that is to say in a noisy and blurred image. For example, the invention aims to process a medical image so as to detect the contour of the left ventricle of the heart.

The object of the invention is achieved by means of a method for processing an intensity image formed of points representing an object, including steps for automatically supplying points determining a minimal path representing the object contour, involving: acquiring data of the intensity image, evaluating probability values indicating the probability that a given point of the image belongs to predefined regions of the image relating to the object, and deriving a contour model of the object from said probability values, transforming the image into a three-dimensional matrix image based on said contour model and said probability values, performing dynamic programming in order to determine said minimum path in said three-dimensional matrix image.

The method according to the invention mitigates the three major drawbacks of the known active contour detection method: initialization dependency, exclusive use of local information and occlusion sensitivity. An important feature of the method of the invention is the introduction of high-order a priori information in each step of the method. Furthermore, the initialization step is completely automated by way of close cooperation between a multi-resolution neural network and a hidden Markov model-enhanced dynamic programming procedure.

An X-ray apparatus associated with a system for carrying out the automatic contour detection of the left ventricle in a digital X-ray image is also proposed.

BRIEF DESCRIPTION OF THE DRAWINGS

These and other aspects of the invention are apparent from and will be elucidated by way of non-limitative example, with reference to the embodiments described hereinafter and the accompanying drawings; therein.

DETAILED DESCRIPTION OF THE PREFERRED EMBODIMENT

Figure 1:
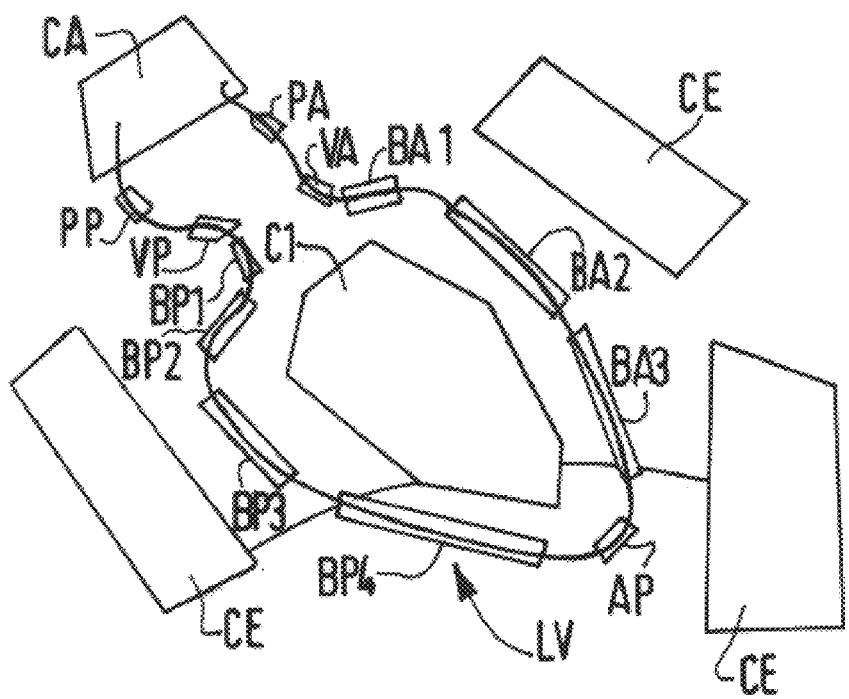
FIG. 1 shows diagrammatically a left ventricle with anatomic classes.

The invention relates to contour detection in low-contrast and noisy images with a wide intrinsic variability as commonly encountered in medical applications. The invention also relates to a robust automatic procedure for application in industrial apparatus.

The invention will be described hereinafter as an example of an application in the medical imaging field. It consists of a method for automatically detecting the left ventricle (LV) boundaries in digital X-ray right anterior oblique (RAO) projection ventriculograms (X-ray images of a ventricle).

As disclosed by the cited publication, it is known to model the problem of contour recovery as an energy minimization process. An energy function is associated with every candidate contour. These active contours are controlled by internal and external forces. The internal forces set the overall shape characteristics such as smoothness whereas external forces attract the contour towards local image features such as a high gradient value. The minimization is carried out by a discrete dynamic programming (DP) procedure. This technique is referred to as active contour (AC) detection. The method is iterative.

The known method has three main drawbacks. The first one is a low precision of initial contour. A problem inherent of each iterative method is the initialization phase. This is even more crucial for the active contour method which requires a good initial contour in order to be able to converge towards the desired edges. This contour usually has to be manually drawn by an operator.

The second drawback lies in the form of the external force that is usually derived from local information only. Any a priori knowledge which could help is thus difficult to introduce. According to the cited publication, this problem is solved by imposing constraints on the overall shape of the desired contour which restrict the internal force inside a small set of admissible forms.

The third drawback lies at the core of the AC algorithm which usually is not robust to occlusion and fails when the pre-processing edge detection step erroneously skips parts of the desired contour.

In order to overcome these difficulties, the invention proposes a new method which is based on close cooperation between a multi-resolution neural network and an enhanced dynamic programming procedure.

This method includes a first step for initialization which involves the use of a neural network NN for automatically finding an initial contour of the left ventricle in the original image. This NN uses global information derived from a pyramid of filters, and the resultant posterior probabilities are used as basic states for a second step for a dynamic programming procedure (DP).

Digital X-ray imaging is commonly used in cardiology applications. A frequent type of heart examination consists in injecting a contrast medium in the left ventricle (LV) of the patient through a catheter. This allows the visualization of the LV chamber in X-ray images. An image or an image sequence may be recorded, and the physician has to outline the LV boundaries in the end-systolic and end-diastolic frames. Relevant parameters, such as LV chamber volumes, ejection fraction and stroke volume can then be computed. Nowadays, techniques for semi-automatic segmentation of the LV in the relevant image frames and for estimation of its volume are available. However, the state-of-the-art algorithms require a fair degree of interaction with a human operator so as to at least pin-point key points in each of the image frames.

Automating this task is challenging, because local image configurations do not provide sufficient information to avoid false key identifications and because the gray scale ventriculograms have a poor contrast and a high level of noise. This noise is due to the scattering of radiation by tissues not related to the ventricle, artifacts generated by the patient's breathing during the catheterization procedure, and interference of the ribs and the diaphragm with the LV. Moreover, the injected contrast medium does not mix uniformly with blood in the LV and the apex zone of the LV generally does not receive much dye.

A major problem with an active contour framework is that its requires a good initial guess in order enable convergence to the desired position. In the medical field this initial contour is usually manually drawn by the operator. Since the aim of the invention is to propose a fully automatic method in order to build an automated system, the first step of the method has to provide a reasonable initial contour. This object is achieved in said first step on the basis of training artificial neural networks with examples.

This first step is based on a NN that uses multi-resolution information to estimate the probabilities that a given point belongs to predefined classes. This first step includes several sub-steps.

In a first sub-step, the NN structure is defined, i.e. its output (feature classes), the points that should be selected and the NN input vectors computed for these points. In a second sub-step, the NN training and results are described, and in a third sub-step the way of building an initial AC contour from its output is given.

The first sub-step is to define the "desired classes" corresponding to the specific features of the object to be detected in the original image. For application to left ventricle contour detection, 15 anatomic classes have been defined accordingly as shown in FIG. 1. The classes BPn and BAn are the LV boundaries (with n=1, . . . , 4). The three key points are the antero and postero sides of the aortic valve, denoted VA and VP, respectively, and the apex, denoted AP. These points are important for characterizing the LV chamber and the physician is usually required to select them manually. In order to increase the selectivity of the neural network, additional classes, being non-LV-boundaries classes, are defined as PA, PP, CA, CI and CE.

In order to reduce the computation time, only the points with "maximum gradient" are fed to the neural network. These are the points whose gradient intensity is a local extremum along its direction. Points where the gradient is lower than that of the nearest neighbors are discarded.

Figure 2:
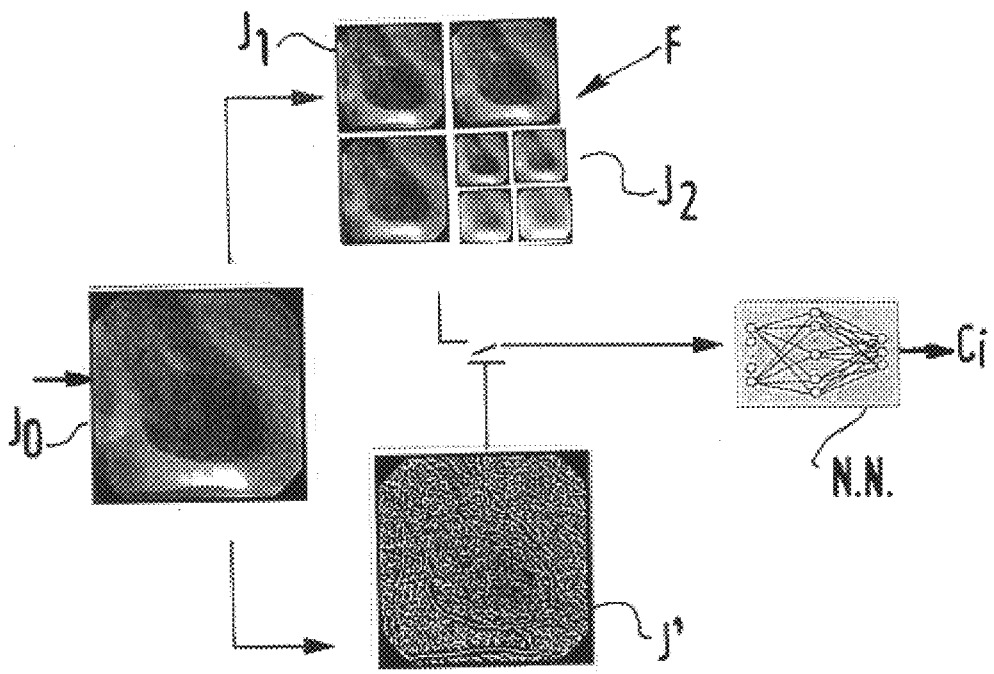
FIG. 2 shows a diagram of the feature vector computations for the neural network.

The first sub-step also serves to define neural network input vectors. Referring to FIG. 2, starting from an original image $J_0$, for instance of 512×512 pixels, a set of low pass filtered versions is generated so as to yield a multi-resolution representation. In addition to the finest scale $L^0$ corresponding to $J_0$, K other scales ($L^k$ with k=1 . . . K) are computed a with half and a quarter nominal image size denoted $J_1$ and $J_2$ and smoothed with kernels of sizes $\sigma_k$ (spatial standard deviation) ranging from 3 to 70 pixels; this is illustrated by the pyramid of filters F shown in FIG. 2. Recursive filtering techniques are used to efficiently implement such large kernel sizes. In the implementation, much attention is paid to achieving nearly isotropic impulse responses. Subsequently the derivatives of the $L^k$ images with respect to x and y are computed. A controllable representation of the filtered output can be derived as a linear combination of the various partial derivatives. This controllable filter bank provides an equivalent representation of the following derivatives:

$$D^l_m L^k = (\partial^l / \partial x^m \partial y^{l-m}) L^k$$

For the finest scale (k=0), one stops at the order l=1, thus generating three components. For the other scales k=1, . . . , 7, derivatives up to the $4^{th}$ order are computed, leading to 105 feature values. To those 105+3 =108 features, information about the gradient is added as illustrated by J' in FIG. 2: one entry for the gradient intensity and 16 binary entries to encode the gradient direction (with a single entry set to 1, the rest being set to 0). The last feature is the edge curvature computed for the first half-size filtered image J1 of the pyramid.

A feature vector V(x,y) of dimension 126 is thus computed for each selected point at position (x,y) of the image. The use of different scales enables combination of local with contextual information. The neural network NN fed with this input vector V(x,y), gives the probabilities of 15 classes, denoted $C_i$, for the current point (x,y). The feature vector computations are illustrated in FIG. 2.

The second sub-step includes the multi-resolution NN training. The neural network architecture is thus defined by 126 input nodes, 50 hidden neurons and 15 output neurons. The training of the neural network is done with a learning set consisting of several thousands of examples (pairs of "feature vector"—"desired output") from several tens of images and the generalization is checked by utilizing a test set consisting of several thousands of examples extracted from several tens of other images. The performance of the neural network are of the order of 93.09% and 79.34% correct classifications for the training and testing sets respectively.

The third sub-step concerns the estimation of the neural Network Outputs. The outputs of the neural network are, therefore an estimate of the posterior probabilities $P(C_i/V$ (x,y)) that the selected point at position (x,y) belongs to the predetermined classes. The NN robustly enables the finding of the most probable region of the image for the important classes. For each of those classes a respective probability image is built, in which the pixel intensities are the corresponding probability estimated by the NN. A zero intensity is attributed to non-selected points.

This image is then smoothed by a rather small kernel (spatial standard deviation of 3 pixels) in order to find regions with high probabilities. In these probability maps the maximum pixel intensity is found for 5 specific probability images. Actually, the first three maxima separated by at least 50 pixels are computed. This leads to $3^5=243$ possible polygon lines linking these 5 specific successive classes: i.e. VA, BA2, AP, BP3 and VP as shown in FIG. 1. Simple rules are used to discard incoherent relative positions of the above five key points and to sort out the acceptable polygons. For example: "the apex should lie to the right of both aortic valve extremities".

Figure 3:
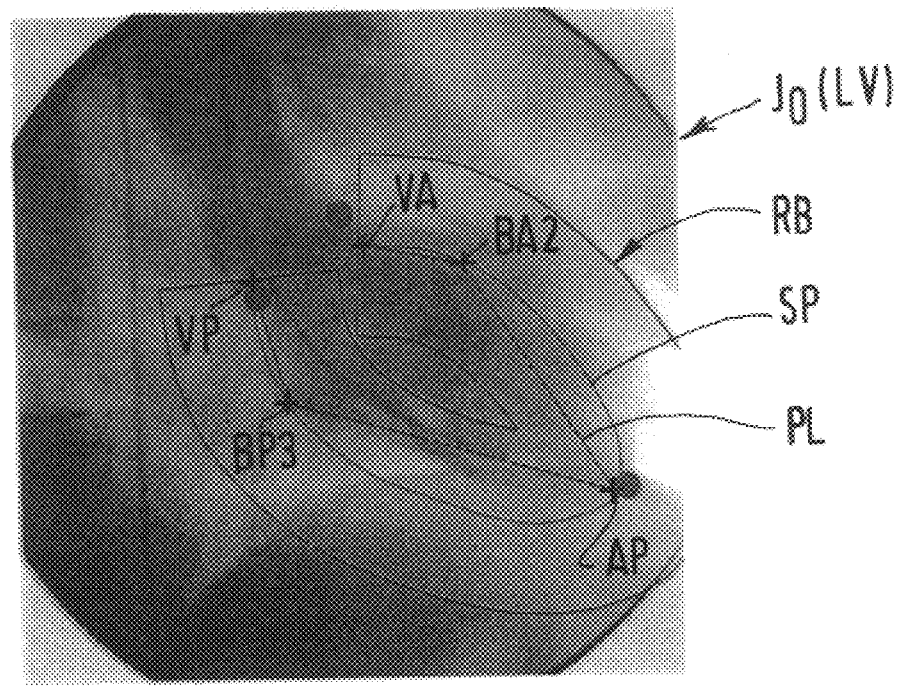
FIG. 3 shows the rubber band in an original X-ray image of the left ventricle.

As shown in FIG. 3, the neural network can thus provide a polygon line (PL) which is a very crude model of the object to be detected. This line is computed from non-local information and is consistent with high-order prior knowledge about the "average" object configuration.

FIG. 3 illustrates the results of the NN for an image where the diaphragm intersects the left ventricle. The disks are the points provided by the physician and the dashed line is the crude model. The crosses along this line are the detected key points. For this image, the average error over the three key points is 16.9 pixels. For 58 test images of size 512×512, the detected key points lie at an average distance of 26.7 pixels from the corresponding points defined by the physician (standard deviation of 19.7). At the present time, the precision required in processing medical images is far greater than in the past. So it no longer suffices to initialize the method by only manually pointing three key points in the image. This is the reason why the object of the present invention is to detect the whole LV contour automatically. Hence, the useful neural network outputs are the polygon line and the probability maps which will be used to transform the image and to direct the dynamic programming (DP) procedure, respectively.

Figure 4:
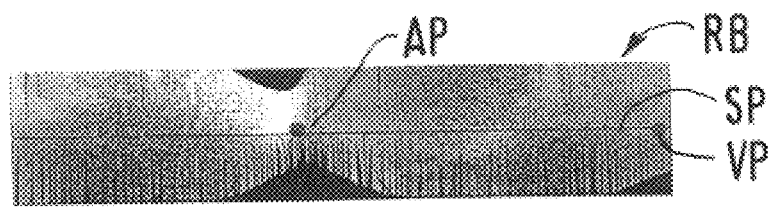
FIG. 4 shows the transformed image of FIG. 3.

The method according to the invention then includes a step for Image Transformation. Because standard DP works in 1-D, a causality rule for images has to be determined. This procedure is carried out by building an image which follows the line previously found with the NN. The new image is a "rubber" band RB around this line. FIG. 3 shows the rubber band along the line defined by the NN. The image to be transformed is delineated around a "spline" SP mathematically calculated on the basis of the polygon line PL. The transformation is based on a minimum distance paradigm. The rubber-band image has to be mapped into a rectangular image. Points in overlapping regions are transformed to the nearest middle line. The corresponding transformed image is shown in FIG. 4. Since it is not a bijective transformation, some points in the image remain black, meaning that they do not correspond to any point.

Figure 5:
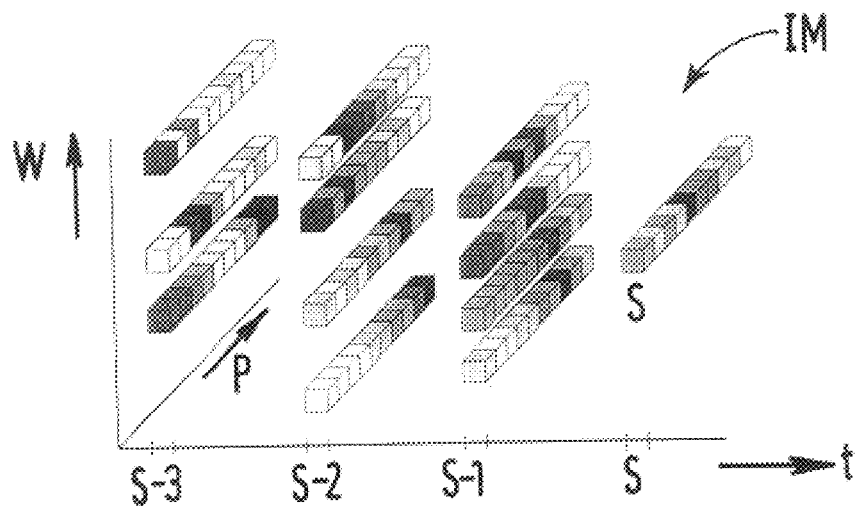
FIG. 5 shows a part of the matrix image.

This rubber-band RB unfolding transformation is performed on the posterior probability P maps computed by the neural network so as to build a 3D probability matrix. The horizontal dimension is the "time" t or the path along the spline SP, the vertical one is defined by the width W of the rubber-band and encodes the candidate points and the third dimension stores the different posterior probabilities P for these points. FIG. 5 shows a small part of such an artificial 3D probability matrix image IM.

The method according to the invention also includes a step for dynamic programming. This step is based on an algorithm in a 2-D form in which, instead of merely linking points as known to those skilled in the art, the algorithm carries out the linking of couples of point and class. The cost of such a link between class i of current point S(x,y) and class j of a possible predecessor S' is defined as:

$$C(S'_j, S_i) = C^*(S_j) \text{ accumulated cost} +$$
$$\beta D(S', S) \text{ point distance} +$$
$$\alpha C(S_i) \text{ local cost} +$$
$$\gamma c_t(j, i) \ j - i \text{ transition cost}$$

where $\alpha$, $\beta$, and $\gamma$ are weighting coefficients. So the cost of a link depends on the accumulated cost for reaching $S'_j$, the distance between the two points S' and S (computed in the original image), the cost for going through:

$$S_i C(S_i) = -\log P(C_i/V(x, y))$$

and a transition cost for going from class j to class i:

$$c_t(j,i) = -\log P(C_i(t)/C_j(t-1))$$

where $P(C_i/V(x, y))$ is the posterior probability for class $C_i$ at the point S(x,y) and is estimated by the multi-resolution neural network. The transition probabilities $P(C_i(t)/C_j(t-1))$ may be fixed beforehand or estimated by a system.

FIG. 5 shows a small synthesized sample of the resultant image matrix IM with the probabilities P(ci) of the various border classes for some selected points indicated in gray: the darker, the higher. Note that the number of points per column s, s-1, s-2 . . . is not constant and that these valid points are not evenly distributed along a column along the time axis.

According to the invention, the method provides the possibility to link points which do not lie in adjacent columns of the transformed image. These "jumps" ensure that a link will be found even should the selection phase have erroneously missed some intermediate points. Previous points are thus searched for in a sector covering several tens of positions, for instance 51 positions. The best cost for arriving at class i of point S is defined as:

$$C^*(S_i) = \min_{j, S'}[C(S'_j, S_i)]$$

where $j \in \{1 \ldots N\}$, and $S' \in Pred(S)$ is the set of valid points in the sector area and N the number of predefined classes. Such links are computed for all couples (point,class) going forward (in the causal order) in the image matrix. The most probable contour CT is then retrieved as the one ending with the lowest cost.

Figure 6:
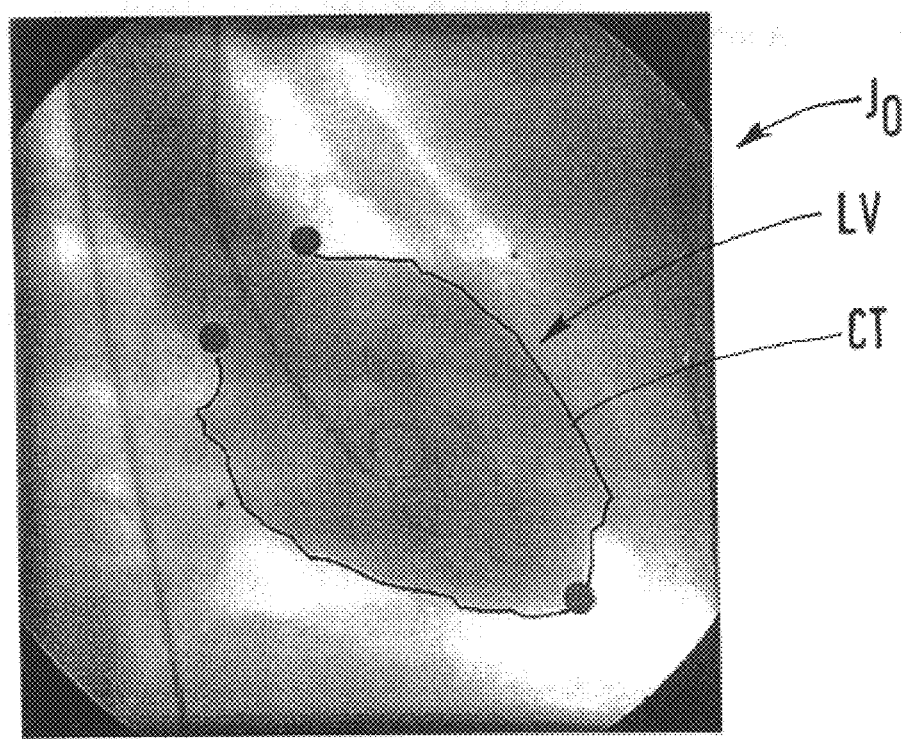
FIG. 6 shows the left ventricle contour detected and superimposed on the original image.

FIG. 6 shows the boundary CT found by this enhanced dynamic procedure (the black line). It may be seen that the use of the posterior probabilities gives very accurate results.

Automatic contour extraction is a difficult issue which is not only useful in medical applications but may also be used in numerous other applications such as object based encoding (as in MPEG-4). The method according to the invention is based on the steps of introducing high order information in the active contour detection procedure. A multi-resolution neural network is used to compute posterior probabilities for predefined classes. These probabilities are first used to define a causality and an image transformation. Next they are used to guide the dynamic programming procedure both in lowering the cost of going through points reliably classified as borders and in defining the cost for linking two such points. This linking is encoded into a probabilistic state automata.

Such fully automatic contour detection can be achieved even in the case of complicated images. The computation time can be reduced by selecting the most relevant features in the large input vector of the NN. Accuracy can be increased by using more images for the NN training.

Figure 7:
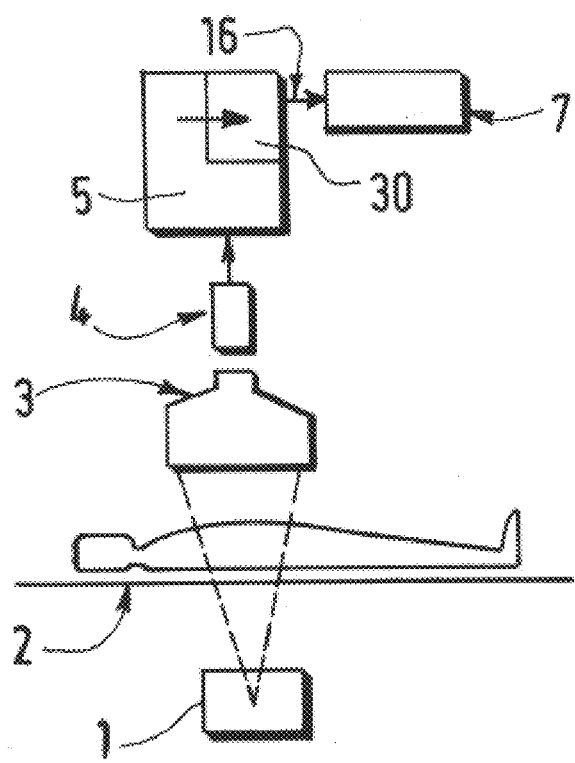
FIG. 7 shows an X-ray apparatus associated with a system for carrying out the method.

FIG. 7 shows, by way of example, an X-ray examination apparatus which includes an X-ray source 1, a table 2 for accommodating a patient, an image intensifier device 3 which is coupled to a camera tube 4 which applies data to a digital image processing system 5 which includes a processor provided with means 30 which are suitable to form an image processing system. This image processing system 30 carries out the contour detection method according to the invention. The processor has several outputs, one output 16 of which is coupled to a display system 7 for the visualization of the radiographic images or intensity images. The display system can include storage means for storing images.

All references cited herein are incorporated herein by reference in their entirety and for all purposes to the same extent as if each individual publication or patent or patent application was specifically and individually indicated to be incorporated by reference in its entirety for all purposes.

What is claimed is:

1. A method for processing an intensity image formed of points representing an object (LV) and for automatically supplying points determining a minimal path representing the object contour (CT), the method comprising:

acquiring data of the intensity image ($J_0$), evaluating probability values (P) indicating the probability that a given point of the image belongs to predefined regions of the image relating to the object, and deriving a contour model (SP) of the object from said probability values (P), transforming the image ($J_0$) into a three-dimensional matrix image (IM) based on said contour model (SP) and said probability values (P), and performing dynamic programming (DP) in order to determine said minimum path (CT) in said three-dimensional matrix image (IM).

2. A method as claimed in claim 1 wherein the step of image transformation further comprises:

building a rubber-band-shaped image which follows the contour model (SP) of the object (LV) derived from said probability values, mapping the rubber-band-shaped image (RB) into a rectangular rubber-band image having the contour model (SP) straightened as a line for the longitudinal axis (t) and a given distance (W) of the points of the image to said longitudinal axis for the orthogonal axis, and forming the three dimensional matrix image based on the rectangular rubber-band image by associating a third dimension with the rubber-band image constituted by the probability values of the points.

3. A method as claimed in claim 2 wherein the step of performing dynamic programming further comprises:

imparting a causal orientation to said longitudinal axis (t), and, in the 3-D matrix image, linking a point (S) associated with its probability value to a predecessor (S') associated with its probability value while minimizing a cost function taking into account said probability values and local and contextual intensity information relating to the points to link.

4. The method of claim 2 wherein the step of evaluating probability values is performed by a neural network which has inputs for vectors taking into account local and contextual intensity information relating to points of the original image and outputs for providing the probability values indicating the probability that a point belongs to a predefined region of the original image.

5. The method of claim 4 further comprising:

selecting a number of important points from among the points determined by the neural network as having a high probability of belonging to corresponding regions, determining a polygon (PL) in the original image from said important points, and building a mathematical line (SP), called spline, from the polygon (PL) so as to constitute the contour model (SP) for the object (LV) in the image.

6. A method as claimed claim 1 wherein the step of evaluating probability values is performed by a neural network which has inputs for vectors taking into account local and contextual intensity information relating to points of the original image and outputs for providing the probability values indicating the probability that a point belongs to a predefined region of the original image.

7. A method as claimed in claim 6 further comprising selecting a number of important points from among the points determined by the neural network as having a high probability of belonging to corresponding regions, determining a polygon (PL) in the original image from said important points, and building a mathematical line (SP), called spline, from the polygon (PL) so as to constitute the contour model (SP) for the object (LV) in the image.

8. A method as claimed in claim 7 where the processed image is a medical X-ray digital image, the object is the left ventricle of the heart, and the object contour is the left ventricle contour which includes at least three important points constituted by the aortic valve limits (VA, VP) and the apex (AP).

9. A system for the processing of a medical image including means for carrying out a method as claimed in claim 1.

10. An X-ray apparatus comprising an x-ray source.

an X-ray detector for forming a medical digital image, an image processing system for performing the method of claim 1, and a system for displaying images processed by the image processing system.

* * * * *